United States Patent [19]

Headley et al.

[11] Patent Number: 5,063,514

[45] Date of Patent: Nov. 5, 1991

[54] ABS YAW CONTROL

[75] Inventors: Philip M. Headley, Brighton; Prakash K. Kulkarni, Novi, both of Mich.

[73] Assignees: General Motors Corporation, Detroit, Mich.; Delco Electronics Corp., Kokomo, Ind.

[21] Appl. No.: 540,250

[22] Filed: Jun. 19, 1990

[51] Int. Cl.$^5$ ............... G06F 15/50; B60T 8/58; B60T 8/64

[52] U.S. Cl. ............... 364/426.02; 303/102; 303/106; 303/111

[58] Field of Search ............ 364/426.02, 426.01; 303/100, 106, 111, 102, 109, 110

[56] References Cited

U.S. PATENT DOCUMENTS

| | | | |
|---|---|---|---|
| 3,918,766 | 11/1975 | Klatt | 303/111 |
| 4,313,166 | 1/1982 | Rode et al. | 303/111 X |
| 4,349,876 | 9/1982 | Lindemann | 303/111 X |
| 4,489,382 | 12/1984 | Jonner et al. | |
| 4,593,955 | 6/1986 | Leiber | 303/111 X |
| 4,651,281 | 3/1987 | Masaki et al. | |
| 4,657,313 | 4/1987 | Fennel et al. | |
| 4,862,368 | 8/1989 | Kost et al. | 364/426.02 |

*Primary Examiner*—Parshotam S. Lall
*Assistant Examiner*—E. J. Pipala
*Attorney, Agent, or Firm*—Howard N. Conkey

[57] ABSTRACT

In a vehicle anti-lock brake controller, a differential slip between the wheels on each side of an axle is sensed to detect a yaw condition and the wheel with the lower slip value is identified as the high coefficient wheel. In response to a detected yaw condition, the monitored value of slip of the high coefficient wheel is controlled about a target slip value that has an initial value less than the critical slip value at the beginning of antilock controlled braking to minimize longitudinal force imbalance and which is thereafter ramped to the critical slip value to maximize longitudinal braking forces.

12 Claims, 3 Drawing Sheets

ABS YAW CONTROL

BACKGROUND OF THE INVENTION

This invention relates to an antilock control system for vehicle wheel brakes.

When the brakes of a vehicle are applied, a longitudinal (or braking) force is generated between the wheel and the road surface. This force is dependent upon various parameters, including the road surface conditions and the amount of slip between the wheel and the road surface. The braking force increases as slip increases, until a critical slip value is surpassed. When the slip exceeds this critical slip value, the braking force at the tire-road interface decreases and the wheel rapidly approaches lockup. The braking forces at the front and the rear wheels together contribute to the total braking force on the vehicle.

As the wheel travels over the road surface, a lateral force may also be generated between the wheel and the road surface. The available lateral force is maximum when there is no wheel slip present and decreases as wheel slip increases. Thus, the lateral force capability of the wheel is maximized when there is no wheel slip present. Increased lateral force capability at the front wheels contributes towards better steerability of the vehicle; while lateral force capability at the rear wheels contributes towards better stability.

Therefore, to obtain an optimal compromise between the objectives of lateral stability, steerability and improved stopping distance, an antilock braking system must be able to effectively trade-off the longitudinal and lateral characteristics.

When the vehicle is braked on a uniform surface while moving in a straight line, the tire-road friction characteristics for all four wheels are similar. In this case, the longitudinal forces on the right hand side of the vehicle and those on the left hand side are nearly equal. Consequently, the force imbalance, if any, is small and can usually be compensated by the lateral forces at the rear wheels. Hence, little or no driver corrective steering action is required to maintain directional stability.

The longitudinal and lateral forces of the wheels are also key factors when the vehicle is operating on a split-coefficient surface. Such a surface is often encountered during normal driving conditions, such as when the vehicle has the right hand side on a soft gravel shoulder while the left hand side is on asphalt. In such a split coefficient situation, the braking force on the higher coefficient (i.e. asphalt) side of the vehicle will be substantially greater than the braking force on the lower coefficient (i.e. gravel shoulder) side of the vehicle, which causes an imbalance of forces. If the lateral forces of the rear wheels are not great enough to counteract the force imbalance, a net yaw moment tending to rotate the vehicle about its vertical axis results. This incipient yaw condition requires the driver of the vehicle to perform corrective steering in order to maintain directional stability.

There are known systems which attempt to detect yaw moment and take corrective action to minimize its build up when performing antilock brake maneuvers on a split coefficient surface. These systems typically make use of devices such as lateral accelerometers, steering position sensors and other auxiliary devices to sense the yaw condition. Once sensed, a typical antilock brake control system then acts to slow down the additional build-up of the yaw moment such as by commanding a lower rate of increase in brake pressure during the apply portion of an antilock braking cycle as compared to the rate of increase commanded on a uniform surface. The effect of this action is to reduce the imbalance between the longitudinal forces on the two front wheels and thereby slow down the build-up of the yaw forces.

However, the use of auxiliary devices in these systems to sense the yaw condition tends to increase the system cost and complicate assembly and service operations. Therefore, it would be preferable for an antilock system to be able to recognize and counteract an incipient yaw condition without auxiliary hardware or devices. Further, the control action in response to the detected yaw condition is in the form of an open loop control. The lower rate of increase in the brake pressure during the apply portion of the antilock braking cycle may be appropriate for one road surface condition but may not be appropriate for all braking surfaces.

SUMMARY OF THE INVENTION

This invention provides for an improved antilock braking system that recognizes and counteracts an incipient yaw condition without the requirement of auxiliary hardware or other devices. This results in an improvement of system cost and complexity. In accord with one aspect of this invention, sensing and control of a yaw condition is accomplished based on the fact that if the brake pressures on two wheels on the same axle are equal, the wheel operating on the higher coefficient surface will have lower slip value than that operating on the lower coefficient surface. When the antilock controller first responds to an incipient wheel lockup condition the brake pressures on both sides of each axle are identical. Based on the above, the differential slip at this time is representative of a yaw condition and the wheel with the lower slip value of the axle pair is identified as the high coefficient wheel. It is this wheel whose braking characteristics are controlled to control the yaw condition.

In accord with another aspect of this invention, the control in response to a yaw condition is provided by closed loop control and therefore adapted to the particular surface condition. In one form of the invention, when an incipient yaw condition is sensed as set forth above, the monitored value of slip of the wheel on the high coefficient surface is controlled about a target slip value that is less than the critical slip value. This corrective action minimizes the longitudinal force imbalance resulting from the split coefficient surface.

However, if the foregoing control of the high coefficient wheel about a target slip value less than the critical slip value is maintained throughout the duration of the stop, the longitudinal braking efficiency may be unnecessarily reduced. Therefore, in accord with another aspect of this invention, the need for yaw corrective action at the beginning of the stop is balanced against the need to provide maximum longitudinal force throughout the stop in order to optimize the braking performance. This is accomplished by an antilock braking control strategy that compromises between the competing objectives by adopting a strategy that minimizes the longitudinal force imbalance at the beginning of the stop and follows with a strategy that maximizes the longitudinal forces later in the stop.

In accord with a further aspect of this invention a smooth transition between the two strategies is provided to prevent an abrupt increase in longitudinal force imbalance and thereby reduce the demands upon the vehicle operator.

DESCRIPTION OF THE DRAWINGS

The invention may be better understood by referencing the preferred embodiment and the drawings in which.

DESCRIPTION OF THE PREFERRED EMBODIMENT

Figure 1:
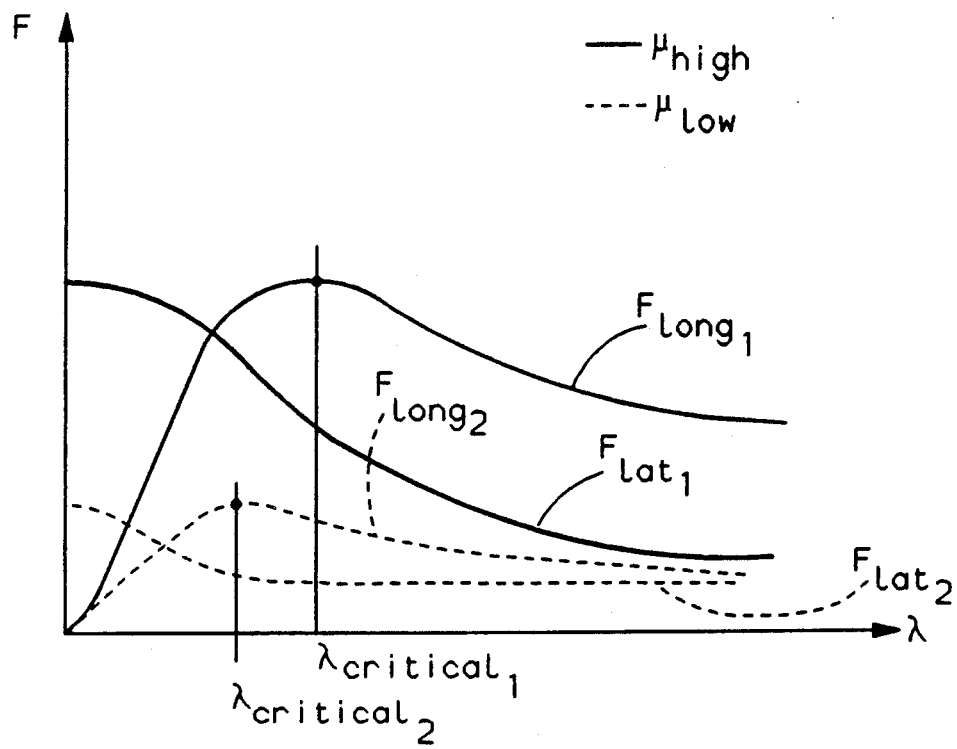
FIG. 1 is a plot of the lateral and longitudinal forces of a wheel operating on high and low coefficient surfaces.

An overview of the dynamic characteristics of a vehicle wheel are illustrated in FIG. 1 which plots the force F between the wheel and road surface versus wheel slip $\lambda$ for a surface having a high peak coefficient of friction (solid lines) and for a surface having a low peak coefficient of friction (dashed lines). It can be seen from this graph that the lateral forces $F_{lat1}$ and $F_{lat2}$ between the wheel and road surface are each maximum when there is no slip and decreases as slip increases and that the longitudinal forces $F_{long1}$ and $F_{long2}$ increase from zero as slip increases until a peak force is reached at critical slips $\lambda_{critical1}$ and $\lambda_{critical2}$. As can be seen, the lateral and longitudinal forces of the low coefficient surface are significantly less than the corresponding forces of the higher coefficient surface.

Figure 2:
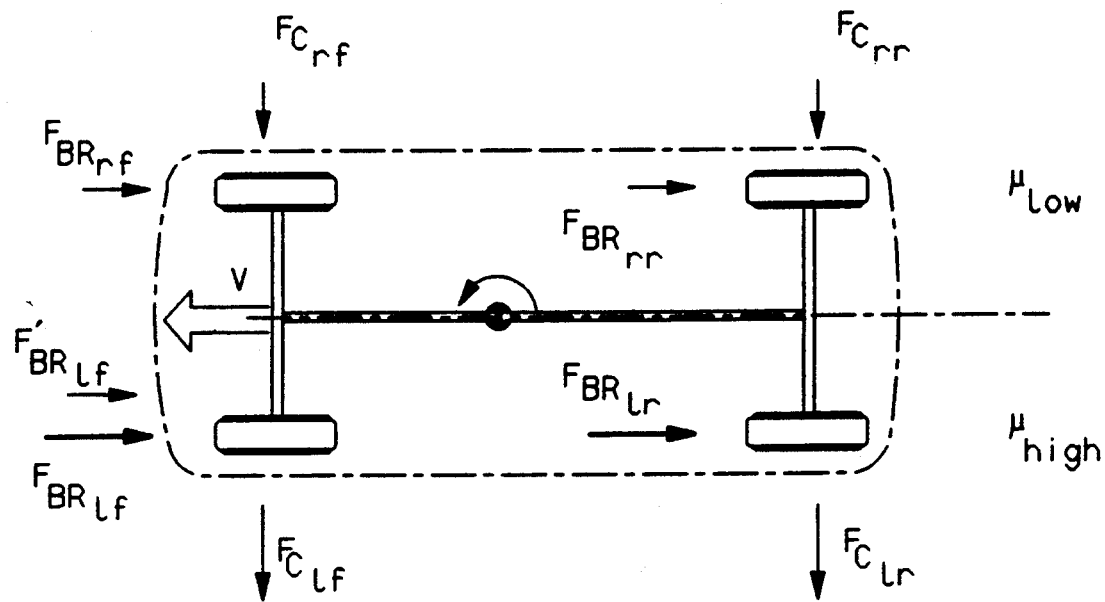
FIG. 2 is a diagram illustrating the forces acting upon a vehicle.

As illustrated in FIG. 2, these longitudinal and lateral forces act differently upon each side of the vehicle when the vehicle is braking on a split-coefficient surface. If each wheel was braked such that each wheel was operated about its respective critical slip value, the wheels on the high coefficient surface would generate more braking force than the wheels on the lower coefficient surface. In this illustration, the left side of the vehicle is operating on the higher coefficient surface ($\mu_{high}$) and the right side of the vehicle is operating on the lower coefficient surface ($\mu_{low}$) The longitudinal (braking) and lateral (cornering) forces on the various wheels are shown as $F_{BR}$ and $F_C$. Thus, for example, the longitudinal force on the left front wheel is labeled as $F_{BRlf}$. The relative magnitudes of these forces are indicated by the length of the force lines. It can be seen that the left side of the vehicle has greater longitudinal forces than the right side of the vehicle. This imbalance of opposite forces creates a yaw moment in the vehicle, tending to rotate it in a counterclockwise manner. If the longitudinal force imbalance remains and the rear wheel lateral forces are unable to counteract, the vehicle will rotate about its vertical axis in a counterclockwise fashion as illustrated in FIG. 2 if left uncorrected by driver steering input.

This invention recognizes the difference in slip between the wheels on the left side of the vehicle and the right side of the vehicle which accompanies such a force imbalance as being indicative of an incipient yaw condition and reduces the target slip value of the high coefficient front wheel during the beginning of the stop in order to reduce the yaw moments. This is shown as a decreased longitudinal force, $F'_{BRlf}$ which reduces the yaw moments.

After the incipient yaw condition has been detected and the braking strategy of the high coefficient front wheel modified to be one of minimizing the longitudinal force imbalance, the invention smoothly transitions the braking strategy of the high coefficient front wheel back to a longitudinal force maximizing strategy. In doing so, braking efficiency is improved while the smooth transition minimizes the steering demands of the vehicle operator.

Figure 3:
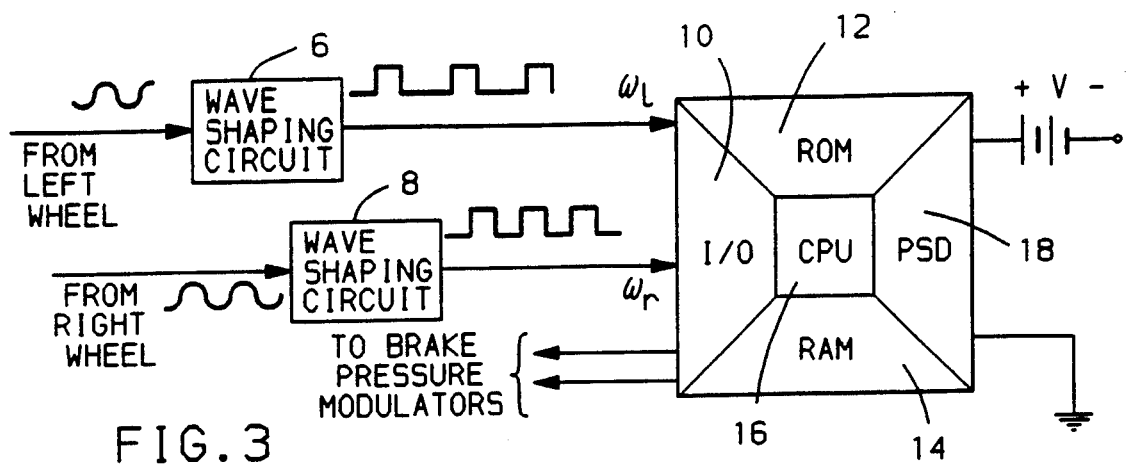
FIG. 3 is a diagram of a digital computer based antilock brake controller.

In this embodiment, the control structure of the invention takes the form of a digital computer. As shown in FIG. 3, the digital computer has inputs coming from at least one conventional left wheel speed sensor via a wave shaping circuit 6 and one conventional right wheel speed sensor via a wave shaping circuit 8, and has an output to left and right wheel brake pressure modulators. In this embodiment, it is assumed that the speed sensors and modulators are associated with the front wheels of the vehicle. However, it is understood that the invention is also applicable to control of the rear wheel brakes when the rear brakes are controlled individually. The pressure modulators may each take the form of a motor driven piston pressure modulator such as illustrated in U.S. Pat. No. 4,881,784 which issued Nov. 21, 1989. The inputs and outputs are interfaced to the digital computer through the I/O 10. The digital computer also includes a read-only memory (ROM) 12 in which the instructions necessary to execute the functions of this invention are stored, a random-access memory (RAM) 14 which is used for the storage of variables, a central processing unit (CPU) 16 which controls the operations of the digital computer, a power supply device (PSD) 18 which interfaces the digital computer to the vehicle power system. The digital computer is powered via the vehicle ignition or other convenient means.

Figure 4:
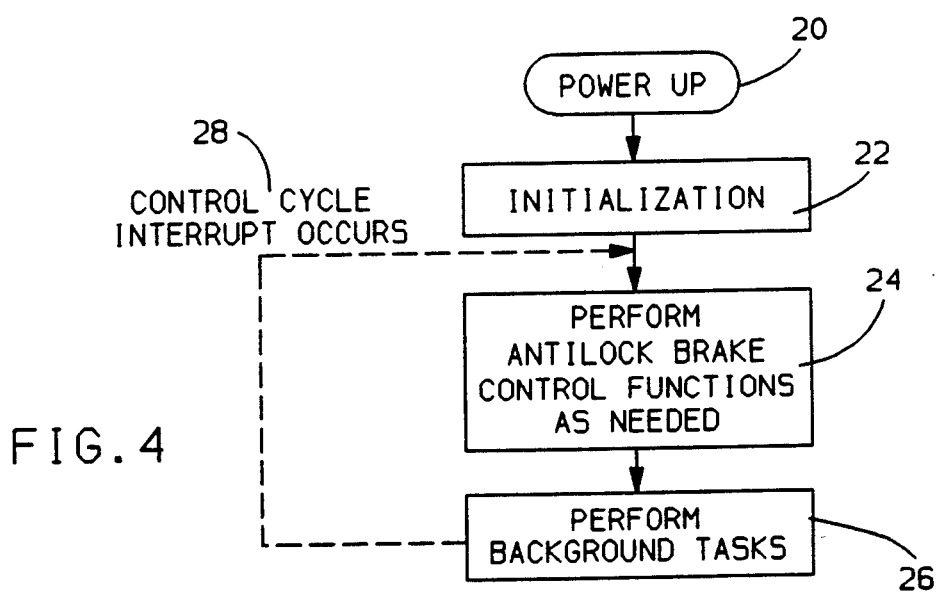
FIGS. 4 and 5 are flow charts illustrating the operation of the controller in carrying out this invention.

The instructions necessary to carry out this invention are depicted in a flow chart shown in FIG. 4. When the vehicle is powered up <20>, the digital computer begins executing the instructions encoded in ROM 12. The first task of the digital computer upon power up is initialization <22>, which entails the stabilizing of voltage levels at the I/O 10, setting various RAM variables to calibrated values, ensuring the integrity of circuitry, and other basic functions of the digital computer. Once the system is initialized, the digital computer proceeds to execute the control cycle. The control cycle consists of instructions which are executed once during each of successive control cycles, such as once every 5 msec.

The first general task encountered in the control cycle is the performance of antilock control functions as needed <24>. The antilock control functions cause wheel brake pressure to be relieved when an incipient wheel lock condition is detected as will occur when the wheel slip exceeds the critical slip value illustrated in FIG. 1 and cause wheel brake pressure to be increased once the incipient lock condition is alleviated. Once the digital computer performs the necessary antilock control functions, it proceeds to perform the background tasks <26>. The background tasks <26> can include such functions as: communication with off-board devices, execution of diagnostic tests, and communication with other vehicle computers, as well as any other application specific task. The digital computer performs the control cycle tasks once every control cycle loop. When a control cycle interrupt occurs <28>, the digital computer begins a new control cycle. Thus, once every control cycle, the digital computer performs antilock control functions <24> and executes the background tasks <26>.

Figure 5:
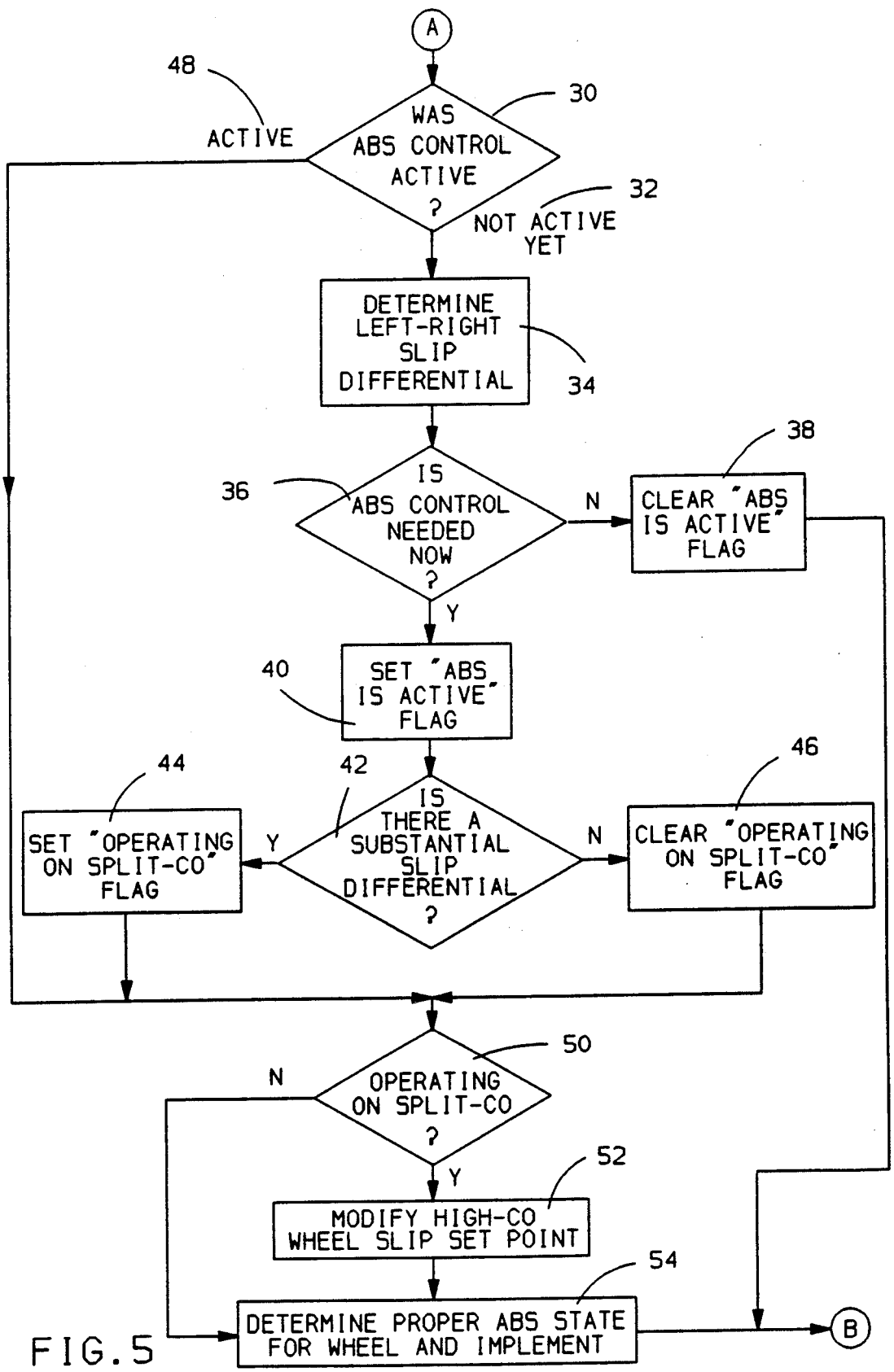

The antilock brake control functions <24> specific to this invention are detailed in FIG. 5. Included in these functions but not illustrated in FIG. 5 are conventional tasks such as: reading wheel speed sensor signal information and calculating wheel speeds, calculating a vehicle reference speed, calculating individual wheel slip, calculating individual wheel acceleration, and other well known functions indigenous to an antilock brake controller.

It should also be briefly noted that, in describing the functions of the digital computer, the text in function block <nn> generally describes the activity of the digital computer. Through the exercise of ordinary skill in the art, one could utilize a variety of information processing languages and/or circuit configurations to implement the task broadly described in function block <nn>.

As discussed earlier, the digital computer, in the performance of antilock control activities, will execute functions such as: computing individual wheel speeds, computing individual wheel accelerations, calculating reference speed, and calculating individual wheel slips. All of these stated activities occur prior entering the flow chart at point A.

The first task of the digital computer upon entering the yaw control routine at point A is to determine whether or not antilock control activities are currently active <30>. Antilock control is considered active when either the left or right wheel exhibits behavior such that it is likely to lock. If antilock control activities are not already active <32>, the next task of the digital computer is to determine the differential in slip between the left and the right side of the vehicle <34>. The determination of the slip differential between the left and the right sides of the vehicle <34> can be accomplished through a variety of methods. In this embodiment, the preferred method is simply to compute the instantaneous difference in slip, $\lambda_{diff}$, between the wheels of the axle pair on the left and the right sides of the vehicle as represented by the expression $$\lambda_{diff} = \lambda_l - \lambda_r$$

where $\lambda_l$ is the slip of the wheel on the left side and $\lambda_r$ is the slip of the wheel on the right side of an axle pair. In an alternative embodiment, a slip difference term, $\lambda_\Delta$, is computed as being:

$$\lambda_\Delta = \int_{t_1}^{t_2} (\lambda_l - \lambda_r) \, dt$$

where $t_1$ corresponds to the time when the brake pedal is activated and the vehicle is braked and $t_2$ corresponds to the time when an incipient lock condition is first detected.

Next, the digital computer determines whether antilock control functions are now necessary <36>. This can be accomplished by examining wheel slip and wheel acceleration for the left and right wheels. High wheel slip and/or high wheel deceleration can be considered indicative of an incipient lock condition. An incipient lock condition requires the antilock controller to take corrective action, meaning antilock control is now needed. Conversely, if the wheel slip and acceleration indicate that the wheel is still operating in the stable region, antilock control is not needed at this time. If antilock control for either wheel is not necessary, the digital computer simply clears the "ABS is active" flag <38> and exits the yaw control routine through point B.

If antilock control is now needed (block <36> true) the digital computer then sets the "ABS is active" flag <40>. It should briefly be reiterated that, in reaching this point, the following conditions were necessary: (a) antilock control was not active yet (block <30> false, path <32>), (b) the digital computer has calculated the slip differential between the left and the right sides of the vehicle <34> and (c) the digital computer, after examining the critical wheel and vehicle parameters has determined the antilock control is now necessary (block <36> true). This means that antilock control is just now going to be initiated. It is during these first moments of antilock control in which the build-up of any yaw moments can be best counteracted thus obviating the need for corrective steering.

The digital computer next determines whether there is a slip differential substantial enough to indicate that the vehicle may be encountering an incipient yaw condition <42>. If the slip differential between the left and the right sides of the vehicle computed at <34> is sufficiently large, this can be considered characteristic of operation on a split coefficient surface, indicating that an excessive yaw moment between the left and the right sides of the vehicle is building up. Therefore, the digital computer sets the "operating on a split coefficient surface" flag <44> before proceeding further. Conversely, if the slip differential represents braking on a substantially uniform surface not giving rise to excessive yaw moments, the digital computer clears the "operating on a split coefficient surface" flag <46>. In practice, there is a sufficient slip differential if $|\lambda_{diff}| > K_{balance}$, where $K_{balance}$ is a constant calibrated factor stored in ROM that accounts for the normal force imbalance and brake effectiveness imbalance between the left and right sides of the vehicle while performing straight-line and turning braking maneuvers on a uniform coefficient surface.

The next task of the digital computer is to determine whether or not the vehicle is likely to be operating on a split coefficient surface such that an incipient yaw condition may exist. If the "operating on a split coefficient surface" flag is clear (block <50> false), it is not likely that the vehicle is experiencing an incipient yaw condition, and the digital computer proceeds to perform antilock braking control as required for each of the wheels according to the respective wheel parameters <54>. A typical antilock braking cycle for a wheel performed via repeated executions of step 54 is as follows. When the wheel conditions represent an incipient wheel lockup condition such as when the wheel slip exceeds a slip threshold, a pressure release mode is indicated and brake pressure is quickly released to allow the wheel to recover from the incipient wheel lockup condition. - TM When wheel conditions represent a recovered condition, an apply mode is indicated and wheel pressure is reapplied, such as to a significant fraction of the wheel pressure at the time pressure was released, and thereafter ramped until another incipient wheel lockup condition is sensed at which time the cycle is repeated. The effect of this cycling is to control the wheel slip at the slip threshold value.

When the routine determines that the vehicle is being braked on a uniform road surface <42, 46, 50>, the slip threshold is a ROM stored calibration critical slip value. This critical slip value may, in one embodiment vary as a function of wheel acceleration or deceleration. This may be implemented in the form of a lookup table in the ROM storing the brake pressure release and apply modes as a function of wheel acceleration/deceleration and wheel slip.

If, however, the "operating on a split coefficient surface" flag is true (block <50> true), the digital computer modifies the high coefficient wheel's slip control characteristic <52>. In accord with this invention, the slip threshold of the wheel being braked on the high coefficient surface is established at a wheel slip target value $\lambda_{target}$ that has an initial value less than the stored critical slip threshold to minimize the longitudinal force imbalance at the beginning of anti-lock braking. Thereafter, the wheel slip target value $\lambda_{target}$ is ramped to the critical slip value whereat longitudinal braking force is maximized. The ramp provides a smooth transition between the two control strategies.

In the preferred embodiment, the modification of the high coefficient wheel's slip control characteristic at step <52> is accomplished by computing the high coefficient wheel slip target value $\lambda_{target}$ in accord with the general expression $\lambda_{target}=f(V, t, \lambda_{diff})$, where f is a predetermined function of vehicle speed (V), time (t) and the measured slip differential ($\lambda_{diff}$). Specifically, the initial value of $\lambda_{target}$ is decreased from the critical slip value by an amount that is directly related to the slip differential ($\lambda_{diff}$) and the rate (the time function) at which $\lambda_{target}$ approaches the critical slip value from the initial value is inversely proportional to the vehicle speed (V). Using this form, the initial slip threshold of the high coefficient wheel is lower when the slip differential is high and closely resembles the actual critical slip value for the high coefficient wheel when the slip differential is low. This reflects the fact that, as the slip differential increases, the imbalance in longitudinal forces is likewise increasing. Thus, when there is a higher slip differential, there is a greater need for reducing the slip threshold of the wheel being braked on the higher coefficient surface to minimize the longitudinal force imbalance.

Recall also that the rate at which the slip target value $\lambda_{target}$ approaches the critical slip value is dependent upon the vehicle speed when yaw control is initiated. When vehicle speed is high, the high coefficient wheel's slip threshold approaches the critical slip value at a low rate. Conversely, when vehicle speed is low, the slip threshold reaches the critical slip value at a moderate-to-high rate. This reflects the concern that at high speeds, the vehicle is more sensitive to direction changes. Thus, at high vehicle speeds, it is desirable to introduce changes in the braking strategy gradually to reduce the need for driver corrective action.

Figure 6:
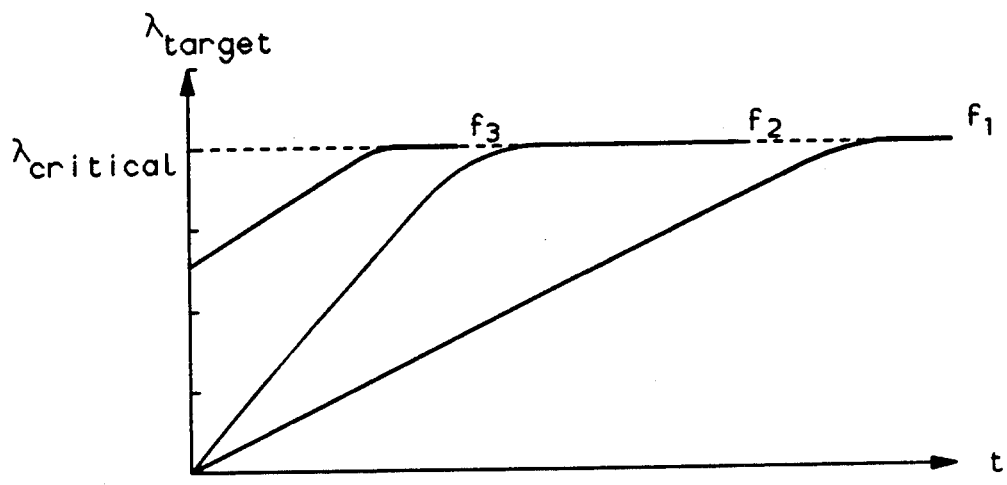
FIG. 6 is a plot depicting the modification of the target slip value in response to a detected incipient yaw condition.

FIG. 6 illustrates this function whereby the slip target value, $\lambda_{target}$, representing the slip threshold of the wheel on the high coefficient surface is shown for three conditions of slip differential and vehicle speed. Curve $f_1$ shows that when the slip differential is high and vehicle speed is high, (a) the initial value of the slip target value is low and (b) the slip target value approaches the critical slip value at a low rate. Curve $f_2$ shows that when the slip differential is high and vehicle speed is low, (a) the initial target slip value is low and (b) approaches the critical slip value at a higher rate. Curve $f_3$ shows that when the slip differential is low and vehicle speed is high, (a) the initial target slip is higher (but still below the critical slip value) and (b) approaches the critical slip value at a low rate.

By modifying the slip threshold as a function of the initial slip differential at ABS entry and vehicle speed, the trade-off of the longitudinal force of the high coefficient wheel between the amount needed to stop the vehicle in the minimum distance and the amount needed to minimize the longitudinal force imbalance is tailored to meet the specific requirements of the vehicle under any situation. The invention provides reduced longitudinal force imbalance at the beginning of the antilock action. The force imbalance then increases gradually through the stop so that the driver need only increase the steering input gradually to keep the vehicle on the desired course. Once the target slip of the front high coefficient wheel reaches the critical slip value, the braking force on the entire vehicle is maximized.

In a simplified version of the preferred embodiment, the modification of the high coefficient wheel's slip control characteristic is accomplished by adding a ROM stored calibrated slip offset, $\lambda_{off}$, to the calculated wheel slip value, $\lambda_{act}$, of the high coefficient wheel to produce a modified slip value $\lambda_{mod}=\lambda_{act}+\lambda_{off}$. As time progresses, $\lambda_{mod}$ is ramped at a fixed rate to $\lambda_{act}$. Using the modified slip value to determine the proper release-/apply mode has the same effect as shifting the slip threshold. For example, when the modified slip value exceeds the ROM stored critical slip threshold thereby indicating an incipient wheel lockup condition, the actual wheel slip is at a value lower than the critical slip threshold.

Once the high coefficient wheel's slip threshold has been modified <52>, the digital computer determines the proper command for each of the modulators and issues that command <54> such that the pressure at each of the controlled wheels is at or substantially near the pressure required to produce each wheel's respective slip threshold value. In the case of the three wheels left unaffected by yaw control, the slip threshold value will be the ROM stored critical slip value. However, in the case of the high coefficient wheel, whose control strategy is being modified to effect yaw control, the slip threshold value is $\lambda_{target}$ which is varied as described above. The digital computer then proceeds to exit the yaw control routine at point B, where it completes the other tasks of the control cycle.

Once yaw control has been initiated and ABS control is still necessary, the digital computer follows path <30>-<50>. Thus, once the yaw situation has initially been identified, yaw control remains active for all subsequent control cycles during the the decay of the high coefficient wheel's slip modification strategy, yaw control is no longer needed. In doing so, this invention is able to effectively trade-off the need for reduced yaw disturbance moment during the first moments of ABS braking against the need for insuring maximum longitudinal force later in the ABS stop to minimize stopping distance. Also, by effecting the movement from the one strategy to the other in a continuous fashion, the vehicle transients that can be introduced by an abrupt change in control strategies are avoided, thus reducing the demands upon the vehicle driver for corrective action.

The foregoing description of the invention and the preferred embodiment have been provided for illustrative purposes and should not be construed to limit or restrict the invention. Thus, through the use of ordinary skill in the art, one could effect modifications to the preferred embodiment without departing from the scope of this invention.

The embodiments of the invention in which an exclusive property or privilege is claimed are defined as follows:

1. A method for controlling brake pressure applied to respective brakes of left and right wheels of an axle of a vehicle traveling over a road surface, the method comprising the steps of:

measuring slip between each of the left and right wheels and the road surface;

detecting an incipient lockup condition of each wheel resulting from the measured slip between that wheel and the road surface exceeding a respective slip threshold of that wheel;

detecting a yaw condition of the vehicle resulting from the wheels being braked on respective portions of the road surface having different friction coefficients;

determining the wheel being braked on the portion of the road surface having the highest friction coefficient;

when a yaw condition is detected, decreasing the slip threshold of the wheel being braked on the portion of the road surface having the highest friction coefficient;

individually decreasing the brake pressure applied to the brake of each wheel in response to a detected incipient lockup condition of that wheel to allow wheel recovery from the incipient lockup condition; and individually increasing brake pressure to the brake of each wheel following recovery of that wheel from the incipient lockup condition.

2. The method of claim 1 wherein the step of detecting a yaw condition includes the steps of:

determining the measured slip between the left wheel and the road surface and the right wheel and the road surface and detecting a yaw condition of the vehicle when the determined difference in the measured slip exceeds a predetermined threshold at the time an incipient lockup condition of one of the wheels is first detected.

3. The method of claim 2 wherein the difference in the measured slip is determined in accord with the expression:

$$\lambda_l - \lambda_r$$

where $\lambda_l$ and $\lambda_r$ are the measured slips between the left and right wheels and the road surface, respectively.

4. The method of claim 2 further including the steps of determining a first time $t_1$ of a predetermined braking condition;

determining a second time, $t_2$ when an incipient lock condition is first detected; and wherein the difference in the measured slip is determined in accord with the expression:

$$\int_{t_1}^{t_2} (\lambda_l - \lambda_r) \, dt$$

where $\lambda_l$ and $\lambda_r$ are the measured slips between the left and right wheels and the road surface, respectively.

5. A method for controlling brake pressure applied to respective brakes of left and right wheels of an axle of a vehicle traveling over a road surface, the method comprising the steps of:

measuring slip between each of the left and right wheels and the road surface;

detecting a yaw condition of the vehicle resulting from the wheels being braked on respective portions of the road surface having different friction coefficients;

determining the wheel being braked on the portion of the road surface having the highest friction coefficient;

detecting an incipient lockup condition of each wheel resulting from the measured slip between that wheel and the road surface exceeding a respective slip threshold of that wheel, each respective slip threshold having an initial value;

decreasing the slip threshold of the wheel being braked on the portion of the road surface having the highest friction coefficient from the initial value when a yaw condition is detected and thereafter returning the decreased slip threshold to the initial value at a controlled rate;

individually decreasing the brake pressure applied to the brake of each wheel in response to a detected incipient lockup condition of that wheel to allow wheel recovery from the incipient lockup condition; and individually increasing brake pressure to the brake of each wheel following recovery of that wheel from the incipient lockup condition.

6. The method of claim 5 further including the step of determining a difference in the measured slip between the left wheel and the road surface and the right wheel and the road surface and wherein the step of decreasing the slip threshold decreases the slip threshold from the initial value by an amount that is a predetermined function of the determined difference in the measured slip at the time an incipient lockup condition of one of the wheels is first detected.

7. The method of claim 5 further including the step of measuring vehicle speed and wherein the controlled rate is a predetermined function of the measured vehicle speed.

8. A system for controlling brake pressure applied to respective brakes of left and right wheels of an axle of a vehicle traveling over a road surface, the system comprising in combination:

means for measuring slip between each of the left and right wheels and the road surface;

means for detecting an incipient lockup condition of each wheel resulting from the measured slip between that wheel and the road surface exceeding a respective slip threshold of that wheel;

means for detecting a yaw condition of the vehicle resulting from the wheels being braked on respective portions of the road surface having different friction coefficients;

means for determining the wheel being braked on the portion of the road surface having the highest friction coefficient;

means for decreasing the slip threshold of the wheel being braked on the portion of the road surface having the highest friction coefficient, when a yaw condition is detected;

means for individually decreasing the brake pressure applied to the brake of each wheel in response to a detected incipient lockup condition of that wheel to allow wheel recovery from the incipient lockup condition; and means for individually increasing brake pressure to the brake of each wheel following recovery of that wheel from the incipient lockup condition.

9. The system of claim 8 wherein the means for detecting a yaw condition includes:

means for determining a difference in the measured slip between the left wheel and the road surface and the right wheel and the road surface and means for detecting a yaw condition of the vehicle when the determined difference in the measured slip exceeds a predetermined threshold at the time an incipient lockup condition of one of the wheels is first detected.

10. A system for controlling brake pressure applied to respective brakes of left and right wheels of an axle of a vehicle traveling over a road surface, the system comprising, in combination:

means for measuring slip between each of the left and right wheels and the road surface;

means for detecting a yaw condition of the vehicle resulting from the wheels being braked on respective portions of the road surface having different friction coefficients;

means for determining the wheel being braked on the portion of the road surface having the highest friction coefficient;

means for detecting an incipient lockup condition of each wheel resulting from the measured slip between that wheel and the road surface exceeding a respective slip threshold of that wheel, each respective slip threshold having an initial value;

means for decreasing the slip threshold of the wheel being braked on the portion of the road surface having the highest friction coefficient from the initial value when a yaw condition is detected and thereafter returning the decreased slip threshold to the initial value at a controlled rate;

means for individually decreasing the brake pressure applied to the brake of each wheel in response to a detected incipient lockup condition of that wheel to allow wheel recovery from the incipient lockup condition; and means for individually increasing brake pressure to the brake of each wheel following recovery of that wheel from the incipient lockup condition.

11. The system of claim 10 further including means for determining a difference in the measured slip between the left wheel and the road surface and the right wheel and the road surface and the means for decreasing the slip threshold decreases the slip threshold from the initial value by an amount that is a predetermined function of the determined difference in the measured slip at the time an incipient lockup condition of one of the wheels is first detected.

12. The method of claim 10 further including means for measuring vehicle speed and wherein the controlled rate is a predetermined function of the measured vehicle speed.

* * * * *